(12) United States Patent
Kobayashi et al.

(10) Patent No.: US 9,591,248 B2
(45) Date of Patent: Mar. 7, 2017

(54) PHOTOELECTRIC CONVERSION APPARATUS AND PHOTOELECTRIC CONVERSION SYSTEM INCLUDING PIXELS WHICH GENERATE SIGNALS BY PERFORMING PHOTOELECTRIC CONVERSION ON INCIDENT LIGHT

(71) Applicant: CANON KABUSHIKI KAISHA, Tokyo (JP)

(72) Inventors: Daisuke Kobayashi, Kawaguchi (JP); Yukio Araoka, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 14/321,425

(22) Filed: Jul. 1, 2014

(65) Prior Publication Data
US 2015/0009380 A1 Jan. 8, 2015

(30) Foreign Application Priority Data

Jul. 5, 2013 (JP) .................. 2013-141204

(51) Int. Cl.
H04N 5/335 (2011.01)
H04N 5/378 (2011.01)
H04N 5/363 (2011.01)
H04N 5/3745 (2011.01)

(52) U.S. Cl.
CPC ............ H04N 5/378 (2013.01); H04N 5/363 (2013.01); H04N 5/3745 (2013.01)

(58) Field of Classification Search
CPC ...................................... H04N 5/378
USPC ........................................ 348/300
See application file for complete search history.

(56) References Cited

U.S. PATENT DOCUMENTS

| 2010/0182472 A1* | 7/2010 | Yamagata | H04N 5/3658 348/302 |
| 2013/0088625 A1* | 4/2013 | Iwata | H04N 5/3658 348/300 |
| 2013/0107086 A1* | 5/2013 | Nagano | H01L 27/14607 348/273 |

FOREIGN PATENT DOCUMENTS

JP 10-150600 A 6/1998

* cited by examiner

Primary Examiner — Usman Khan
(74) Attorney, Agent, or Firm — Canon USA, Inc. IP Division

(57) ABSTRACT

In a photoelectric conversion apparatus, a signal generation circuit includes an amplification unit which generates a reference signal and which is configured the same as amplification units included in pixel output circuits, and a signal based on a reference signal is supplied to input nodes of a plurality of signal processing circuits or input nodes of a plurality of signal output circuits.

12 Claims, 14 Drawing Sheets

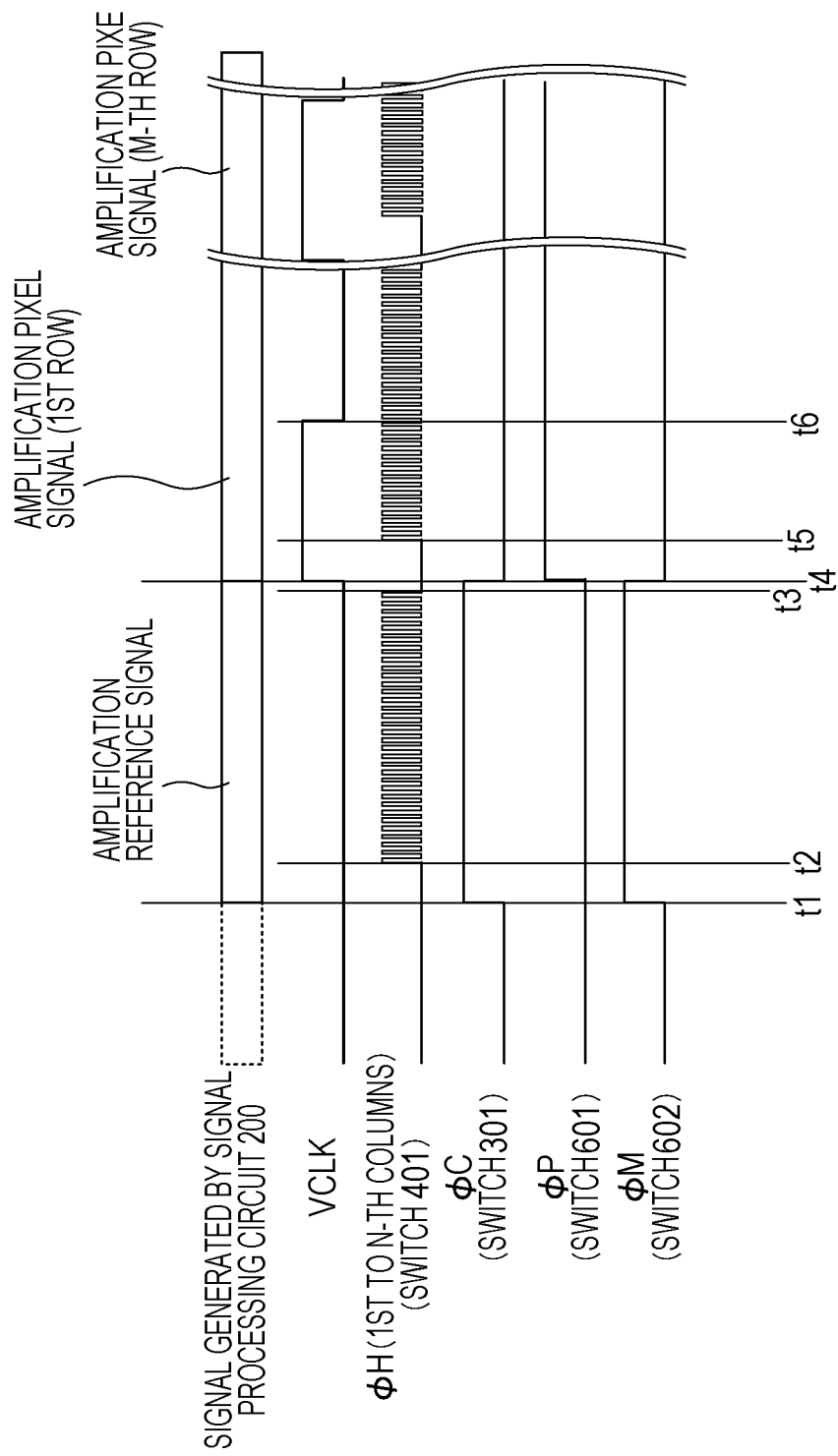

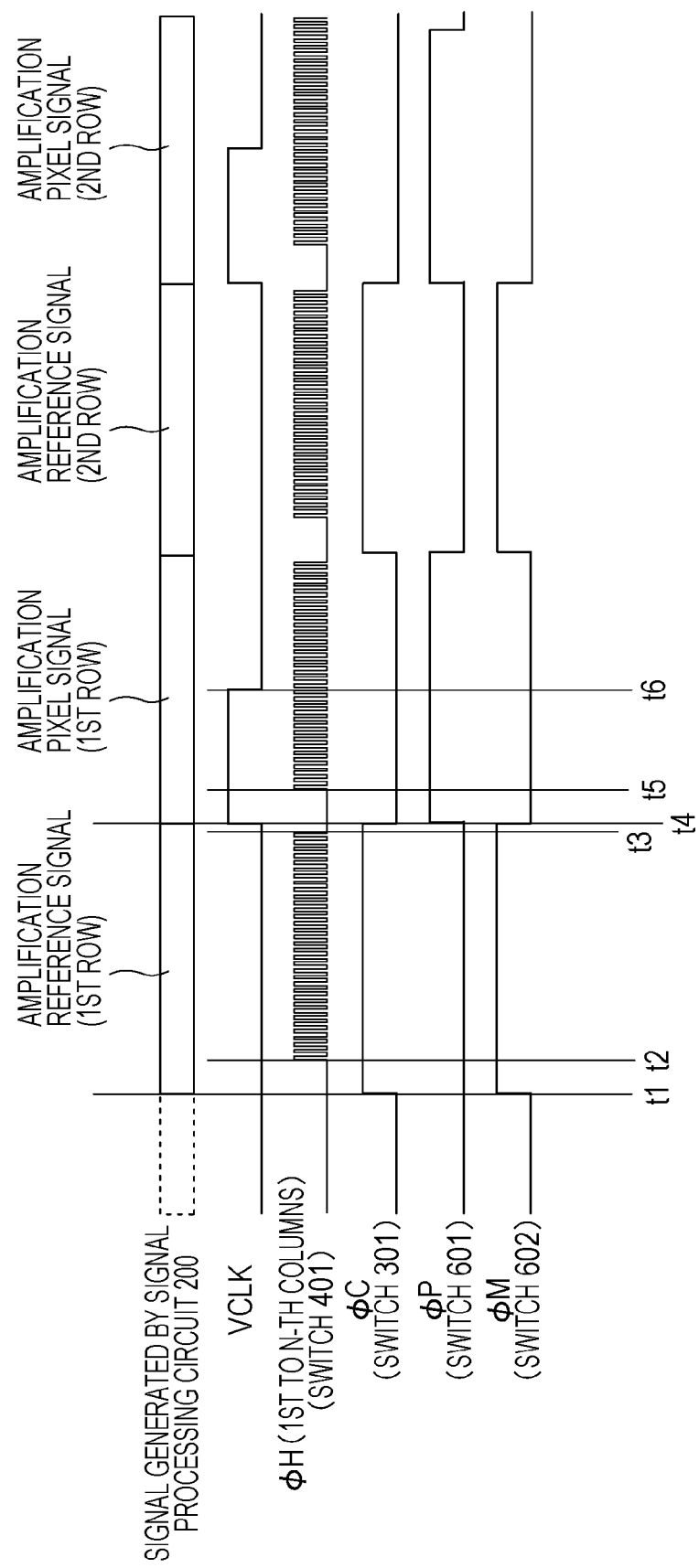

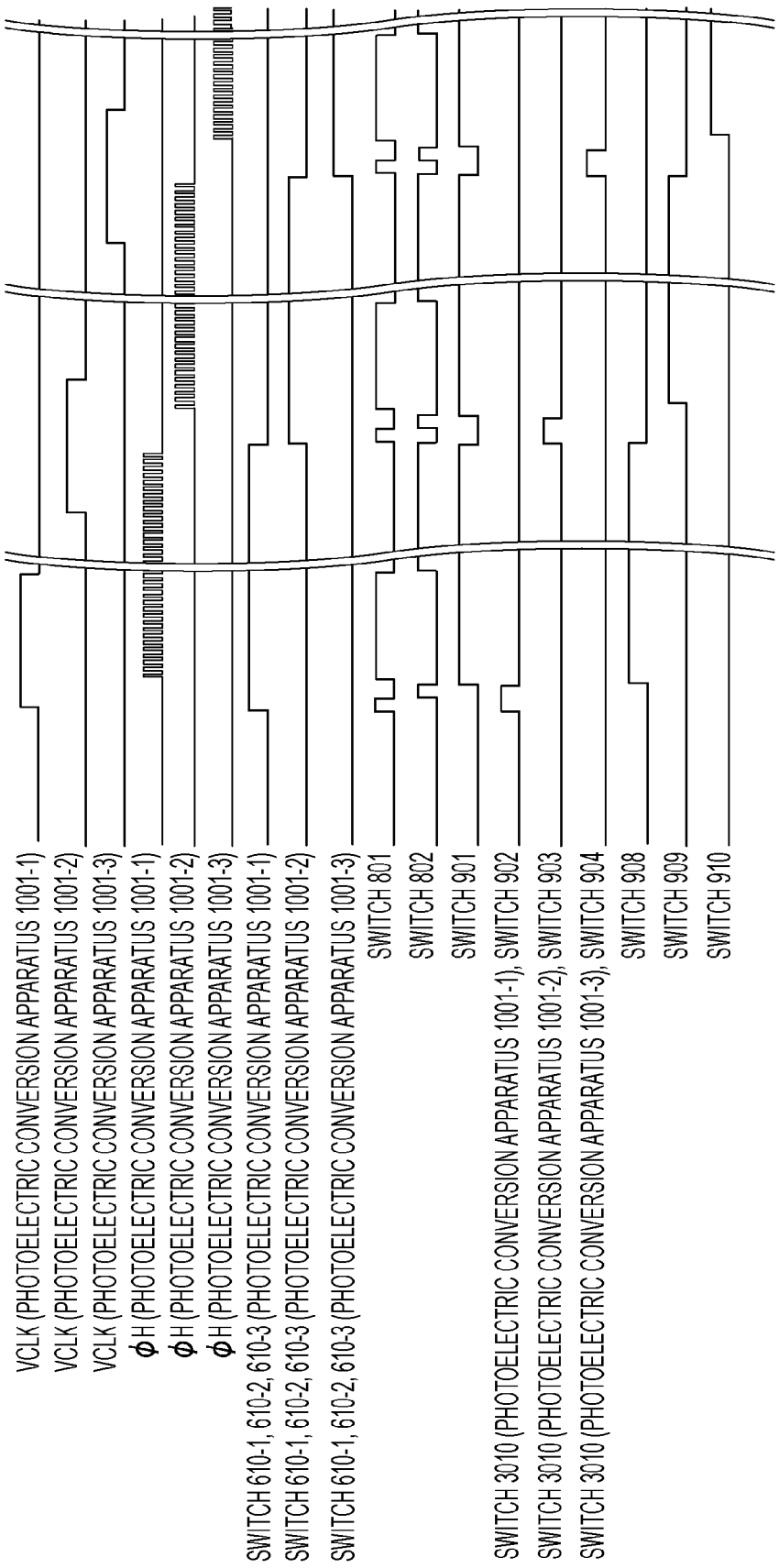

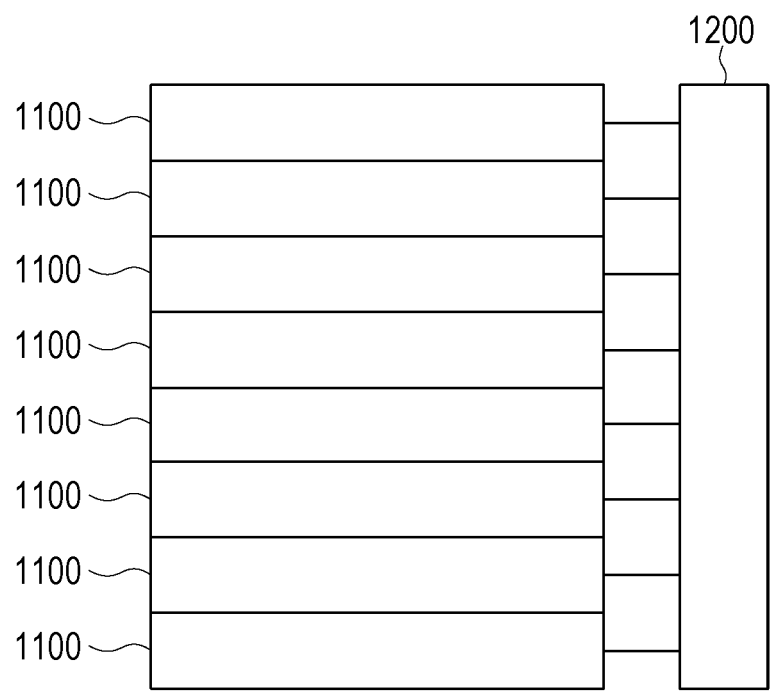

PHOTOELECTRIC CONVERSION APPARATUS AND PHOTOELECTRIC CONVERSION SYSTEM INCLUDING PIXELS WHICH GENERATE SIGNALS BY PERFORMING PHOTOELECTRIC CONVERSION ON INCIDENT LIGHT

BACKGROUND OF THE INVENTION

Field of the Invention

The present invention relates to a photoelectric conversion apparatus including pixels which generate signals by performing photoelectric conversion on incident light.

Description of the Related Art

In Japanese Patent Laid-Open No. 10-150600 discloses a photoelectric conversion apparatus which inputs a fixed voltage shared by a plurality of signal reading paths so that noise caused by differences among offset components of the signal reading paths is reduced.

SUMMARY OF THE INVENTION

According to an embodiment of the present invention, there is provided a photoelectric conversion apparatus including a plurality of pixel output circuits each including a photoelectric conversion unit which generates electric charge and a first amplification unit which outputs pixel signals, a signal processing circuit configured to process the pixel signals, a signal generation circuit, a plurality of output circuits, a first transfer line, and a second transfer line. Pixel signals having different signal values are supplied from the first amplification unit to the signal processing circuits. The signal processing circuit is electrically connected to an input node of a first output circuit through the first transfer line, the first output circuit being one of the plurality of output circuits. The signal processing circuit is electrically connected to an input node of a second output circuit through the second transfer line, the second circuit being one of the plurality of output circuits. The signal generation circuit has a second amplification unit which is configured the same circuit as the first amplification units and which generates a reference signal. A signal based on the reference signal is supplied commonly to the input node of the first output circuit and the input node of the second output circuit.

According to another embodiment of the present invention there is provided a photoelectric conversion apparatus including a plurality of pixel output circuits each including a photoelectric conversion unit which generates electric charge and a first amplification unit which outputs a pixel signal based on the electric charge, a plurality of signal processing circuits each including an input node to which the pixel signal is supplied and configured to process the pixel signal, and a signal generation circuit. The signal generation circuit has a second amplification unit which is configured the same circuit as the first amplification unit and which generates a reference signal. A signal based on the reference signal is supplied to the input nodes of the plurality of signal processing circuits.

Further features of the present invention will become apparent from the following description of exemplary embodiments with reference to the attached drawings.

BRIEF DESCRIPTION OF THE DRAWINGS

FIG. 2B is a diagram illustrating an example of operation of the photoelectric conversion apparatus according to the first exemplary embodiment.

FIG. 5B is a diagram illustrating an example of operation of the photoelectric conversion apparatus according to the fourth exemplary embodiment.

FIG. 9B is a diagram illustrating an example of operation of the photoelectric conversion system according to the eighth exemplary embodiment.

FIG. 10 is a diagram illustrating an example of a configuration of a photoelectric conversion system according to a ninth exemplary embodiment.

DESCRIPTION OF THE EMBODIMENTS

In the photoelectric conversion apparatus disclosed in Japanese Patent Laid-Open No. 10-150600, although a common voltage is input to the signal reading paths, a circuit which outputs the voltage is not associated with circuits of pixels. Therefore, in the photoelectric conversion apparatus disclosed in Japanese Patent Laid-Open No. 10-150600, it is difficult to address variation of differences among offset components of the signal reading paths caused by change of an operation environment of the photoelectric conversion apparatus.

In a technique described below, countermeasure for change of differences among offset components of signal reading paths caused by change of an operation environment of a photoelectric conversion apparatus is discussed.

Hereinafter, exemplary embodiments of a photoelectric conversion apparatus will be described with reference to the accompanying drawings.

First Exemplary Embodiment

Figure 1A:
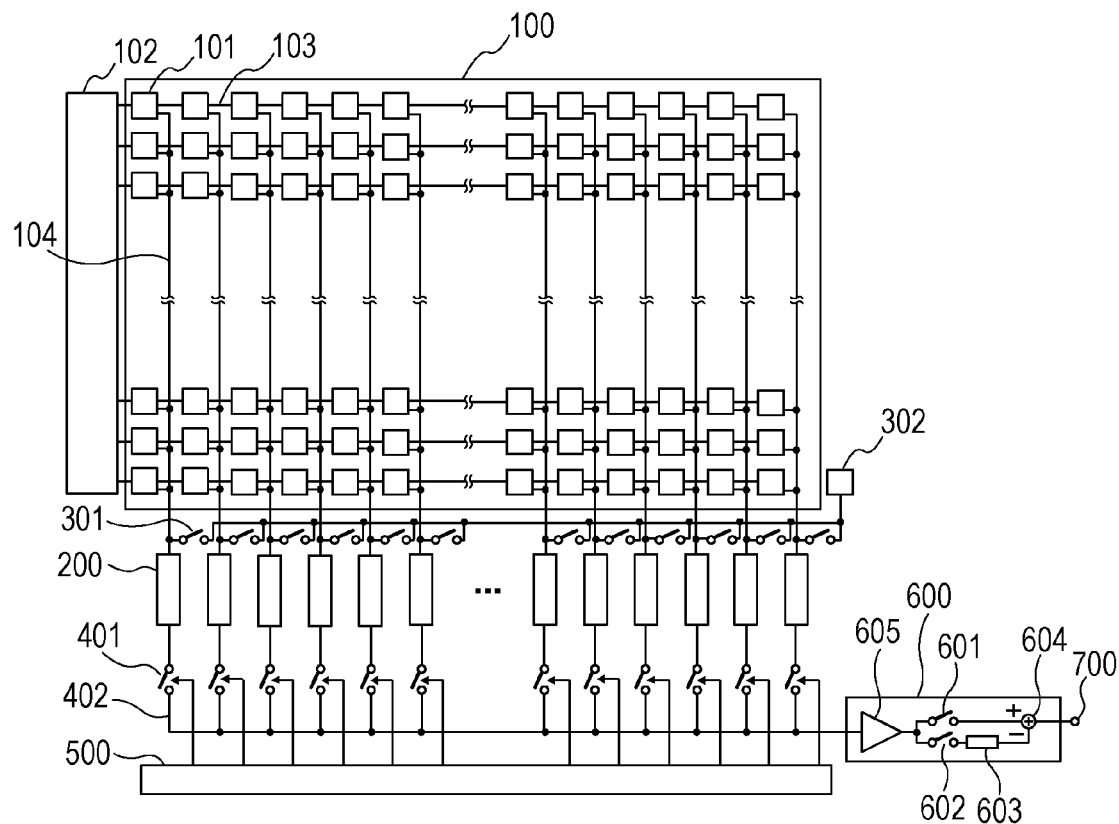
FIG. 1A is a diagram illustrating an example of a configuration of a photoelectric conversion apparatus according to a first exemplary embodiment.

FIG. 1A is a diagram illustrating a photoelectric conversion apparatus according to a first exemplary embodiment.

A pixel array 100 of FIG. 1A is a block including pixel output circuits 101 arranged in a matrix of M rows and N columns. Each of the pixel output circuits 101 includes a photoelectric conversion unit and an amplification circuit. A pixel control circuit 102 controls a photoelectric conversion operation and a reading operation performed by the pixel output circuits 101. Control signal lines 103 transmit control signals output from the pixel control circuit 102 to the pixel output circuits 101. Although being represented as a single signal line in FIG. 1A, each of the control signal lines 103 are a plurality of control lines in practice. A number of the pixel output circuits 101 in a row selected by the pixel control circuit 102 supply pixel signals to corresponding pixel output lines 104 each of which is shared by a number of the pixel output circuits 101 in the same column. Here, output and non-output of a reference signal from a signal generation circuit 302, which will be described hereinafter, is controlled by a timing generator, not illustrated. The pixel output lines 104 serve as signal lines which transmit pixel signals output from the pixel output circuits 101. In the photoelectric conversion apparatus illustrated in FIG. 1A, signal processing circuits 200 are provided for respective columns of the pixel output lines 104.

In this exemplary embodiment, offset components of the signal processing circuits 200 are focused as offset components of a plurality of signal reading paths.

Input nodes of the signal processing circuits 200 are connected to the corresponding pixel output lines 104. The signal processing circuits 200 process pixel signals supplied through the pixel output lines 104. The signal processing circuits 200 of this exemplary embodiment generate signals by amplifying the pixel signals and hold the signals. Hereinafter, the signals generated by the signal processing circuits 200 by amplifying the pixel signals are referred to as "amplification pixel signals". A horizontal selection circuit 500 controls switches 401 of the individual columns. The horizontal selection circuit 500 sequentially brings the switches 401 of the individual columns to a conductive state. By this, the signal processing circuits 200 sequentially supply the amplification pixel signals to an output circuit 600 through a transfer line 402. Although a sift register, a decoder, and the like may be employed as a configuration example of the horizontal selection circuit 500, a shift register is used in this exemplary embodiment. Furthermore, the output circuit 600 includes switches 601 and 602, a memory 603, an operation circuit 604, and a buffer circuit 605. The amplification pixel signals transferred to the output circuit 600 are output from the photoelectric conversion apparatus through an output node 700.

Switches 301 are connected to the corresponding input nodes of the signal processing circuits 200. The timing generator brings the switches 301 connected to the corresponding signal processing circuits 200 in the individual columns to a conductive state. By this, potentials of the input nodes of the signal processing circuits 200 in the individual columns correspond to a potential of a reference signal supplied from the signal generation circuit 302. Specifically, the signal generation circuit 302 supplies the same reference signal to the input nodes of the signal processing circuits 200. The signal processing circuits 200 amplify the reference signal supplied from the signal generation circuit 302 similarly to the pixel signals. Hereinafter, signals generated by the signal processing circuits 200 by amplifying the reference signal are referred to as "amplification reference signals". The amplification reference signals are based on the reference signal. The horizontal selection circuit 500 sequentially transfers the amplification reference signals generated by the signal processing circuits 200 in the individual columns to the output circuit 600.

Figure 1B:
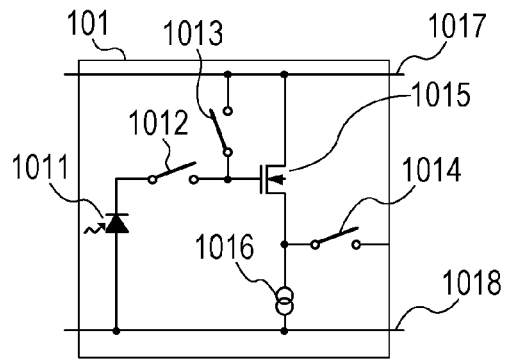
FIG. 1B is a diagram illustrating an example of a configuration of a pixel output circuit according to the first exemplary embodiment.

FIG. 1B is a diagram illustrating an example of a configuration of the pixel output circuits 101 of this exemplary embodiment each of which includes a photoelectric conversion unit 1011, switches 1012, 1013, and 1014, a transistor 1015, and a current source 1016. Furthermore, driving power is supplied from a power supply line 1017 and a ground line 1018. The pixel control circuit 102 controls a conductive state and a nonconductive state of the switches 1012, 1013, and 1014. The switch 1012 may be a transistor which performs completely-depleted transfer of electric charge generated by the photoelectric conversion unit 1011 to an input node of the transistor 1015. A source follower circuit of the pixel output circuits 101 includes the transistor 1015, the power supply line 1017, and the current source 1016.

The pixel control circuit 102 resets potentials of the photoelectric conversion unit 1011 and the input node of the transistor 1015 to potentials based on a potential of the power supply line 1017 after bringing the switches 1012 and 1013 to a conductive state. The potential which is input to the input node of the transistor 1015 corresponds to a reset potential. A power supply voltage is supplied from the power supply line 1017 to one of main nodes of the transistor 1015. The other of the main nodes of the transistor 1015 is electrically connected to the switch 1014 and the current source 1016.

The pixel control circuit 102 cancels the reset of the potentials of the photoelectric conversion unit 1011 and the input node of the transistor 1015 after bringing the switches 1012 and 1013 to a nonconductive state. A signal output from the transistor 1015 on the basis of the potential of the input node of the transistor 1015 to which the reset potential is input has a reset level.

Then the photoelectric conversion unit 1011 performs photoelectric conversion to generate electric charge in accordance with incident light. The pixel control circuit 102 brings the switch 1012 to a conductive state, and transfers the electric charge generated by the photoelectric conversion unit 1011 to the input node of the transistor 1015. The transistor 1015 supplies a signal based on the electric charge supplied to the input node to the switch 1014. When the pixel control circuit 102 brings the switch 1014 to a conductive state, the signal output from the transistor 1015 is supplied to a corresponding one of the pixel output lines 104. The pixel signal is output by the transistor 1015 on the basis of the electric charge of the photoelectric conversion unit 1011.

Figure 1C:
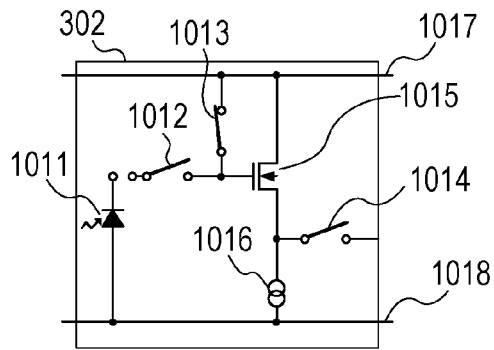
FIG. 1C is a diagram illustrating an example of a configuration of a signal generation circuit according to the first exemplary embodiment.

FIG. 1C is a diagram illustrating an example of a configuration of the signal generation circuit 302 of this exemplary embodiment. Although components of the signal generation circuit 302 are the same as those of the pixel output circuits 101 illustrated in FIG. 1B, a photoelectric conversion unit 1011 and a switch 1012 are not electrically connected to each other and a switch 1013 is normally in a conductive state. A reference signal output from the signal generation circuit 302 is based on a potential of an input node of a transistor 1015 to which a reset potential is input.

The signal output from the transistor 1015 of the signal generation circuit 302 is determined to correspond to the signal of the reset level output from the transistor 1015 of the pixel output circuits 101. Accordingly, signal values of amplification reference signals generated by the signal processing circuits 200 correspond to signal values of signals obtained when the signal processing circuits 200 amplify the signals of the reset level output from the respective transistors 1015. A switch 1014 of the signal generation circuit 302 is controlled by the timing generator. Furthermore, the power supply line 1017 and the ground line 1018 of the signal generation circuit 302 are shared by the pixel output circuits 101. For example, a power supply voltage is input from the power supply line 1017 to one of main nodes of the transistor 1015. The other of the main nodes of the transistor 1015 is electrically connected to the switch 1014 and a current source 1016.

Here, the signal generation circuit 302 may not include the photoelectric conversion unit 1011 as long as the signal generation circuit 302 includes the transistor 1015 which outputs a signal of a reset level. A source follower circuit of the signal generation circuit 302 includes the transistor 1015, the power supply line 1017, and the current source 1016. The transistor 1015 of the signal generation circuit 302 is fabricated by a fabrication process the same as that of the transistors 1015 of the pixel output circuits 101. The transistors 1015 of the pixel output circuits 101 and the signal generation circuit 302 have substantially the same ratio W/L which is a ratio of a gate width W to a gate length L. A value of W/L of the transistor 1015 of the signal generation circuit 302 may be in a range equal to or larger than 0.95 times and equal to or smaller than 1.05 times a value of W/L of the transistors 1015 of the pixel output circuits 101. The source follower circuits including the transistors 1015 of the pixel output circuits 101 serve as first amplification units included in the pixel output circuits 101. The source follower circuit including the transistor 1015 of the signal generation circuit 302 serves as a second amplification unit included in the signal generation circuit 302.

Figure 2A:
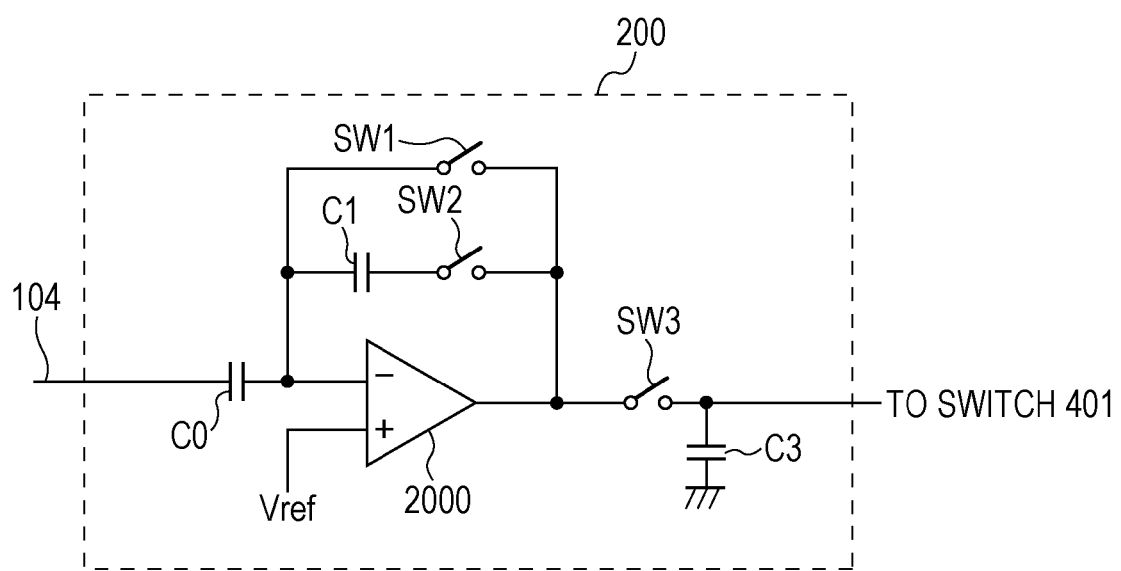
FIG. 2A is a diagram illustrating an example of a configuration of a signal processing circuit according to the first exemplary embodiment.

FIG. 2A is a diagram illustrating a certain one of the signal processing circuits 200 of this exemplary embodiment. The signal processing circuit 200 includes capacitive elements C0, C1, and C3, switches SW1, SW2, and SW3, and an amplifier 2000. A signal input to a corresponding one of the pixel output lines 104 is supplied to an inverting input node of the amplifier 2000 through the capacitive element C0. A reference voltage Vref is input to a non-inverting input node of the amplifier 2000. The capacitive element C1 is disposed in a feedback path of the amplifier 2000. When the timing generator brings both of the switches SW1 and SW2 to a conductive state, a signal of the capacitive element C1 is reset. A signal output from the amplifier 2000 is supplied to the capacitive element C3 through the switch SW3. The amplifier 2000 amplifies a pixel signal supplied from the inverting input node so as to output an amplification pixel signal. Furthermore, the amplifier 2000 amplifies a reference signal supplied from the non-inverting input node so as to output an amplification reference signal. The capacitive element C3 and a corresponding one of the switches 401 are electrically connected to each other.

FIG. 2B is a timing chart illustrating operation of the photoelectric conversion apparatus illustrated in FIG. 1A. In this specification, the individual switches are brought to a conductive state when control signals input to the switches are brought to a high level (hereinafter referred to as an "H level") whereas the individual switches are brought to a nonconductive state when the control signals input to the switches are brought to a low level (hereinafter referred to as an "L level").

A signal VCLK illustrated in FIG. 2B is an instruction signal input to the pixel control circuit 102 from the timing generator, not illustrated, and included in the photoelectric conversion apparatus. When the signal VCLK is brought to an H level from an L level, the pixel control circuit 102 selects one of the rows of the pixel output circuits 101. By this, the pixel output circuits 101 of the selected row sequentially supply pixel signals to the corresponding pixel output lines 104.

The horizontal selection circuit 500 sequentially controls the switches 401 of the first to N-th columns in accordance with control signals φH. Note that the signal processing circuit 200 of the first column is disposed closest to the pixel control circuit 102 among the signal processing circuits 200 illustrated in FIG. 1A.

The timing generator, not illustrated, controls the switches 301 in accordance with a control signal φC.

The timing generator, not illustrated, controls the switch 601 in accordance with a control signal φP.

The timing generator, not illustrated, controls the switch 602 in accordance with a control signal φM.

The timing generator maintains the control signal φC in an H level in a period from a time point t1 to a time point t4. Since the control signal φC is in the H level, a common reference signal is supplied to the signal processing circuits 200 of the individual columns from the signal generation circuit 302. The signal processing circuits 200 in the individual columns generate amplification reference signals on the basis of the reference signal.

The horizontal selection circuit 500 sequentially brings the control signals φH corresponding to the signal processing circuits 200 of the first to N-th columns to an H level starting from the first column in a period from a time point t2 to a time point t3. By this, the amplification reference signals are successively supplied from the signal processing circuits 200 of the individual columns to the transfer line 402.

The timing generator maintains the control signal φM in an H level in a period from the time point t1 to the time point t4. By this, the amplification reference signals of the individual columns input to the transfer line 402 are supplied to the memory 603. The memory 603 stores the supplied amplification reference signals of the individual columns.

The timing generator brings the control signals φC and φM to an L level at the time point t4.

Furthermore, the timing generator brings the signal VCLK to an H level at the time point t4. By this, the pixel output circuits 101 of the first row supply pixel signals generated through photoelectric conversion performed on incident light to the corresponding pixel output lines 104. The signal processing circuits 200 of the individual columns generate respective amplification pixel signals by amplifying the pixel signals supplied from the corresponding pixel output lines 104.

The horizontal selection circuit 500 sequentially brings the control signals φH starting from the signal processing circuit 200 of the first column to an H level at a time point t5. By this, the amplification pixel signals are sequentially supplied from the signal processing circuits 200 of the individual columns to the transfer line 402.

The timing generator brings the control signal φP to an H level. Accordingly, the individual amplification pixel signals input to the transfer lines 402 are supplied to the operation circuit 604. Furthermore, the amplification reference signals are supplied from the memory 603 to the operation circuit 604. The operation circuit 604 supplies signals representing differences between the amplification pixel signals and the amplification reference signals to the output node 700.

The signals output from the operation circuit 604 will be described.

When the timing generator brings the control signal φC to an H level, potentials of the input nodes of the signal processing circuits 200 in the individual columns correspond to a potential of the reference signal. Since the potentials of the input nodes of the signal processing circuits 200 of the individual columns are the same as one another, differences among offset components of the signal processing circuits 200 are represented by variations of signal values of the amplification reference signals generated by the signal processing circuits 200 of the individual columns. The amplification pixel signals generated on the basis of the pixel signals also include differences of the offset components of the individual signal processing circuits 200. Accordingly, the operation circuit 604 generates signals represented by differences between the amplification pixel signals and the amplification reference signals generated by the same signal processing circuits 200. By this, the offset components of the individual signal processing circuits 200 may be subtracted from the amplification pixel signals. Therefore, the photoelectric conversion apparatus of this exemplary embodiment may output the amplification pixel signals after differences among the offset components of the individual signal processing circuits 200 are subtracted from the amplification pixel signals.

In the photoelectric conversion apparatus of this exemplary embodiment, the reference signal in a range of the pixel signals is supplied to the input nodes of the signal processing circuits 200 in common. Accordingly, the operation circuit 604 may generate amplification pixel signals from which differences among the offset components of the signal processing circuits 200 generated in the range of the pixel signals are subtracted.

The photoelectric conversion apparatus of this exemplary embodiment uses the reference signal having a signal value corresponding to the signals of the reset level output from the pixel output circuits 101. An image obtained by photographing a subject of low brightness is easily affected by the differences among the offset components of the individual signal processing circuits 200 when compared with a subject of high brightness. Therefore, when the amplification reference signals based on the reference signal of the signal value corresponding to the signals of the reset level which have small signal amplitude are used, the differences among the offset components of the individual signal processing circuits 200 which easily affect the photographing of a subject of low brightness may be reduced.

Furthermore, the signal generation circuit 302 receives a power supply voltage from a power source shared with the pixel output circuits 101. Therefore, the signal generation circuit 302 and the pixel output circuits 101 may be affected by variation of the power supply voltage by the same degree.

Furthermore, the signal generation circuit 302 includes the transistor 1015 having a configuration the same as those of the pixel output circuits 101. Therefore, the transistor 1015 of the signal generation circuit 302 and the transistors 1015 of the pixel output circuits 101 may be affected by variation of an operation environment of the photoelectric conversion apparatus by the same degree.

Furthermore, the signal generation circuit 302 has a configuration the same as those of the pixel output circuits 101. Therefore, in the photoelectric conversion apparatus of this exemplary embodiment, the signal values of the amplification reference signals change in accordance with change of the signal values of the amplification pixel signals caused by change of the operation environment of the photoelectric conversion apparatus including a temperature and an operation voltage of the photoelectric conversion apparatus and noise from an outside of the photoelectric conversion apparatus. Accordingly, since the operation circuit 604 subtracts the amplification reference signals from the amplification pixel signals, the photoelectric conversion apparatus of this exemplary embodiment may reduce adverse effects caused by change of the operation environment of the photoelectric conversion apparatus in the amplification pixel signals.

Here, the photoelectric conversion apparatus of this exemplary embodiment outputs signals which have been amplified by the signal processing circuits 200. As another example, each of the signal processing circuits 200 may include a holding unit which holds an input signal and which supplies the held signal to the output circuit 600.

Furthermore, in the photoelectric conversion apparatus of this exemplary embodiment, channel widths of the transistors 1015 of the pixel output circuits 101 and the transistor 1015 of the signal generation circuit 302 may be the same as each other, and channel lengths of the transistors 1015 of the pixel output circuits 101 and the transistor 1015 of the signal generation circuit 302 may be the same as each other. By this, the pixel output circuits 101 and the signal generation circuit 302 are affected by the operation environment of the photoelectric conversion apparatus by the same degree.

Here, in the photoelectric conversion apparatus of this exemplary embodiment, the timing generator maintains the control signal φC in the H level in the period from the time point t1 to the time point t4. Alternatively, the timing generator may maintain the control signal φC in an H level in a period from the time point t1 to the time point t2 and maintain the control signal φC in an L level in a period from the time point t2 to the time point t4.

In this exemplary embodiment, the first and second amplification units correspond to the source follower circuits. Alternatively, the first and second amplification units may correspond to differential amplifiers. That is, the first and second amplification units are the same circuits. For example, the numbers of switches disposed to input signals to the first amplification units of the pixel output circuits 101 and the number of switches disposed to input signals to the second amplification unit of the signal generation circuit 302 may be different from each other.

Alternatively, each of the first and second amplification units may include a plurality of source follower circuits, and an output signal of a certain one of the source follower circuits may be amplified by another one of the source follower circuits which outputs the amplified signal.

Furthermore, the photoelectric conversion apparatus of this exemplary embodiment may include signal processing circuits 200 in a single column for the pixel output circuits 101 of a plurality of columns.

Second Exemplary Embodiment

A portion of a photoelectric conversion apparatus according to a second exemplary embodiment which is different from the first exemplary embodiment will be mainly described.

Figure 3A:
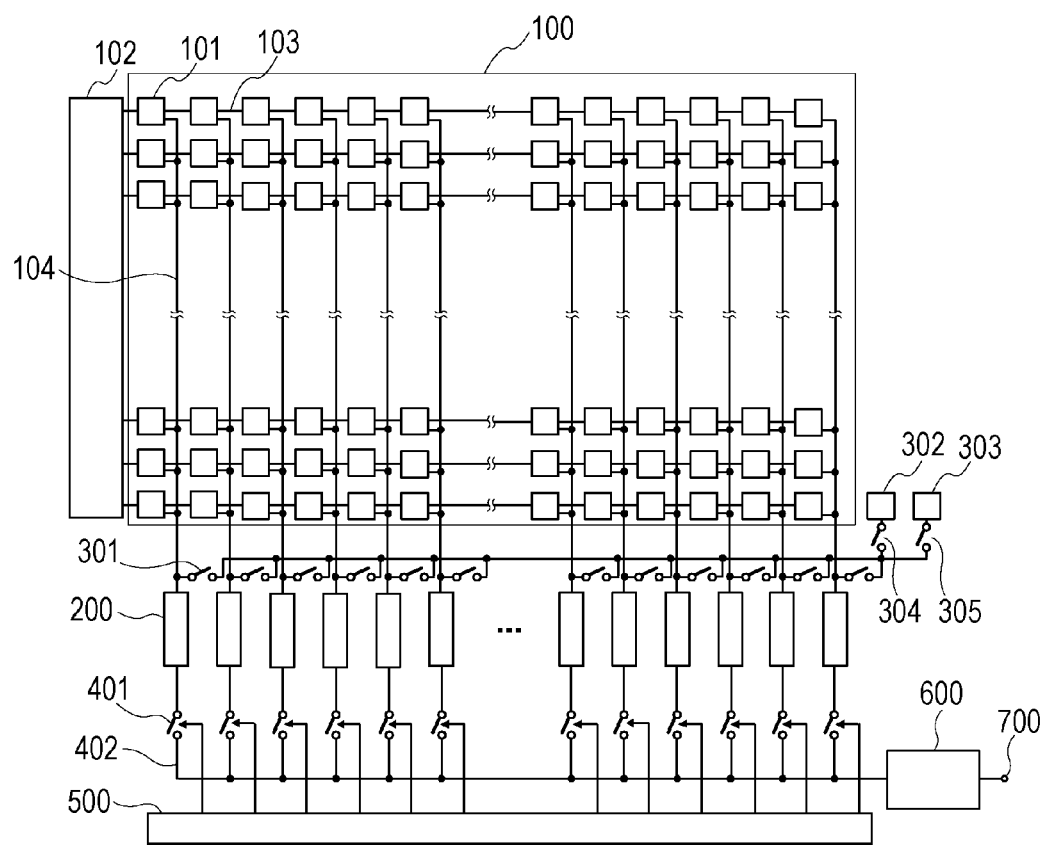
FIG. 3A is a diagram illustrating an example of a configuration of a photoelectric conversion apparatus according to a second exemplary embodiment.

FIG. 3A is a diagram illustrating the photoelectric conversion apparatus according to the second exemplary embodiment. The photoelectric conversion apparatus of this exemplary embodiment further includes, in addition to the signal generation circuit 302 described in the first exemplary embodiment, a signal generation circuit 303 which supplies a common reference signal to signal processing circuits 200 in a plurality of columns.

Figure 3B:
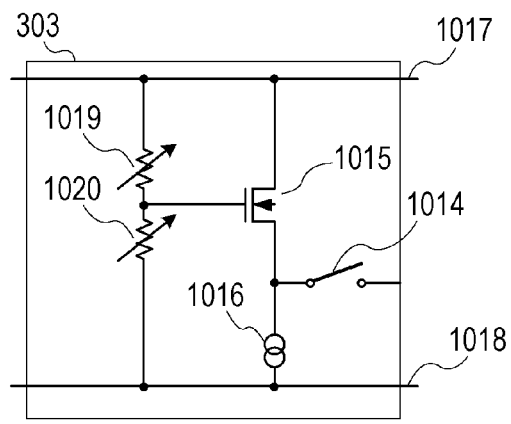
FIG. 3B is a diagram illustrating an example of a configuration of a signal generation circuit according to the second exemplary embodiment.

FIG. 3B is a diagram illustrating a configuration of the signal generation circuit 303 of this exemplary embodiment. The signal generation circuit 303 is different from the signal generation circuit 302 illustrated in FIG. 1C in that a potential different from a potential of a power supply line 1017 may be input to an input node of a transistor 1015.

The signal generation circuit 303 includes resistances 1019 and 1020 having variable resistance values in an electric path between the power supply line 1017 and a ground line 1018. A potential based on the resistance values of the resistances 1019 and 1020 and potentials of the power supply line 1017 and the ground line 1018 is supplied to the input node of the transistor 1015. The signal generation circuit 303 may output reference signals of various signal values by changing the resistance values of the resistances 1019 and 1020. Therefore, in the photoelectric conversion apparatus of this exemplary embodiment, not only signals of a reset level but also reference signals of various signal values may be supplied to input nodes of the signal processing circuits 200.

In this exemplary embodiment, when a timing generator brings a switch 304 to a conductive state, a reference signal is supplied from the signal generation circuit 302 to the signal processing circuits 200 of the individual columns. On the other hand, when the timing generator brings a switch 305 to a conductive state, a reference signal is supplied from the signal generation circuit 303 to the signal processing circuits 200 of the individual columns. The timing generator brings switches 301 to a conductive state while one of the switches 304 and 305 is in the conductive state. By this, the input nodes of the signal processing circuits 200 of the individual columns have the same potential.

The photoelectric conversion apparatus of this exemplary embodiment may select one of the signal generation circuits 302 and 303 as a circuit which supplies a reference signal to the input nodes of the signal processing circuits 200. The signal generation circuit 302 supplies a reference signal corresponding to signals of a reset level of the pixel output circuits 101 to the input nodes of the signal processing circuits 200. The individual signal processing circuits 200 generate amplification reference signals on the basis of the reference signal supplied from the signal generation circuit 302. An output circuit 600 has a configuration the same as that of the first exemplary embodiment. A memory 603 of the output circuit 600 stores the amplification reference signals. The signal generation circuit 303 supplies a reference signal of a signal value which is different from the signal value of the reference signal output from the signal generation circuit 302 to the input nodes of the signal processing circuits 200. The signal processing circuits 200 generate amplification reference signals on the basis of the reference signal supplied from the signal generation circuit 303. The memory 603 of the output circuit 600 also stores these amplification reference signals. Accordingly, the memory 603 stores the amplification reference signals generated by the signal processing circuits 200 on the basis of the different reference signals of different signal values supplied from the signal generation circuits 302 and 303. The signal values of the amplification reference signals based on the reference signal output from the signal generation circuit 303 are within a range of possible signal amplitude of the amplification pixel signals. Accordingly, gain correction of the signal processing circuits 200 may be performed within the range of the possible signal amplitude of the amplification pixel signals by the amplification reference signals based on the reference signal supplied from the signal generation circuit 303. The gain correction will now be described. It is assumed that the signal value of the reference signal output from the signal generation circuit 303 is denoted by "A", and an amplification factor of the signal processing circuits 200 is denoted by "B". In this case, ideal values of the amplification reference signals based on the reference signal output from the signal generation circuit 303 generated by the signal processing circuits 200 is represented by "A×B". Meanwhile, assuming that an actual signal value stored in the memory 603 is denoted by "C", the output circuit 600 holds "(A×B)/C" as a gain correction value. Then the output circuit 600 corrects the amplification pixel signals using the correction value (A×B)/C.

Alternatively, the gain correction may be performed using the reference signal output from the signal generation circuit 302 and the signal generation circuit 303. It is assumed that the signal value of the reference signal output from the signal generation circuit 303 is X times the signal value of the reference signal output from the signal generation circuit 302. Furthermore, it is assumed that an ideal amplification factor of the signal processing circuits 200 is denoted by "Y". In this case, ideal values of signal values of the amplification reference signals based on the reference signal output from the signal generation circuit 303 are X×Y times signal values of the amplification reference signals based on the reference signal output from the signal generation circuit 302. The output circuit 600 obtains ratios of the signal values of the amplification reference signals based on the reference signal output from the signal generation circuit 303 to the signal values of the amplification reference signals based on the reference signal output from the signal generation circuit 302 from signals actually output from the signal processing circuits 200 and obtains shifts from the signal values which are X×Y times the signal values of the amplification reference signals based on the reference signal output from the signal generation circuits 302 as correction values. In this way, the output circuit 600 may perform the gain correction. Alternatively, the signal generation circuit 303 may further output a reference signal of another signal value and the output circuit 600 may obtain correction values using the plurality of reference signals output from the signal generation circuit 303 and the reference signal output from the signal generation circuit 302.

In this exemplary embodiment, the photoelectric conversion apparatus including the signal generation circuit 303 in addition to the signal generation circuit 302 has been described. As another example, the photoelectric conversion apparatus of this exemplary embodiment may not include the signal generation circuit 302 but only include the signal generation circuit 303.

Third Exemplary Embodiment

A portion of a photoelectric conversion apparatus according to a third exemplary embodiment which is different from the first exemplary embodiment will be mainly described.

In this exemplary embodiment, signal generation circuits 302 are disposed in a pixel array 100, and potentials of a power supply line 1017, a ground line 1018, and a driving bias, not illustrated, are the same as potentials of pixel output circuits 101.

Figure 4:
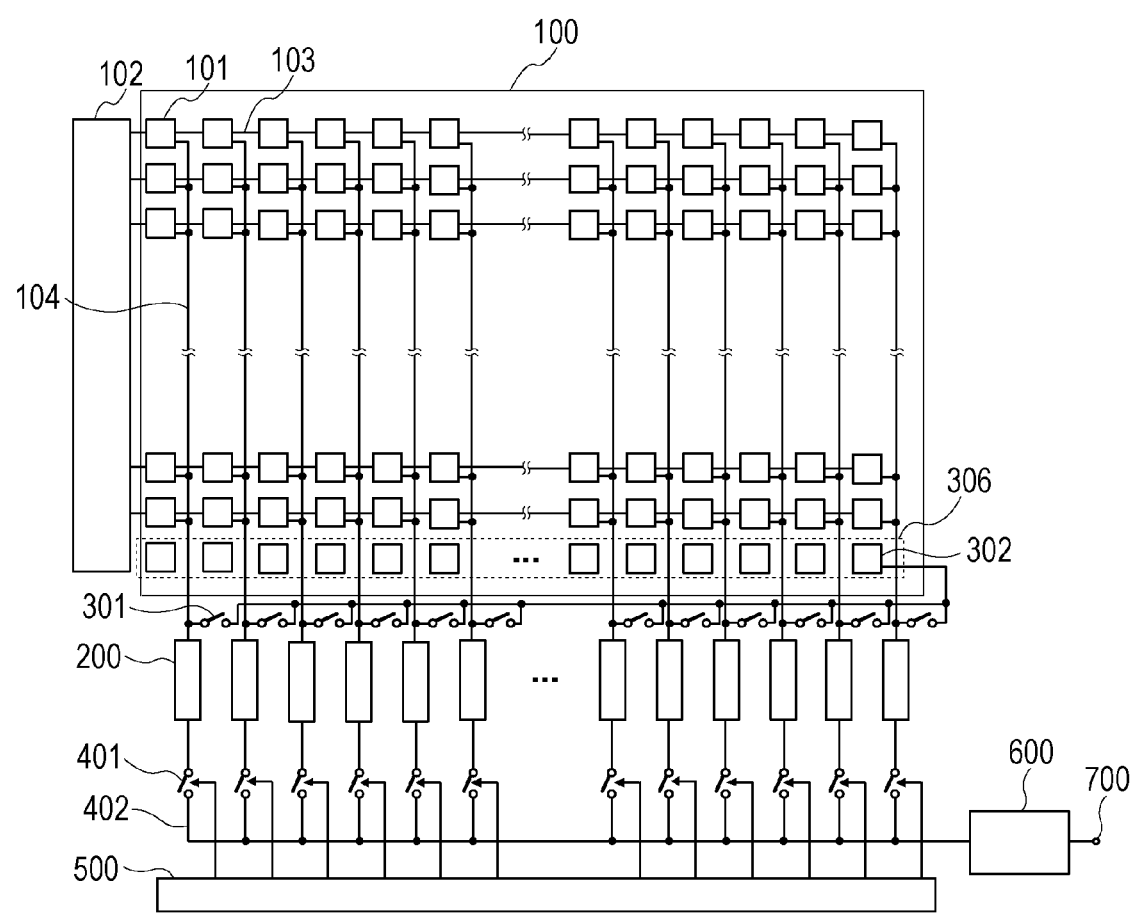
FIG. 4 is a diagram illustrating an example of a configuration of a photoelectric conversion apparatus according to a third exemplary embodiment.

The photoelectric conversion apparatus illustrated in FIG. 4 includes a signal generation circuit group 306 including the signal generation circuits 302 in a region corresponding to one row in the pixel array 100. Arrangement of the power supply line 1017 and the ground line 1018 of the signal generation circuits 302 is the same as those of the pixel output circuits 101. Specifically, in the photoelectric conversion apparatus illustrated in FIG. 4, the signal generation circuits 302 are disposed in the pixel array 100 and the arrangement of the power supply line 1017 and the ground line 1018 of the signal generation circuits 302 is the same as those of the pixel output circuits 101. By this, operation environments of the signal generation circuits 302 and the pixel output circuits 101 may be easily uniformed. The operation environments include potentials of the power supply line 1017 and the ground line 1018 and a temperature of the photoelectric conversion apparatus. Note that, in the signal generation circuit group 306 of FIG. 4, one of the signal generation circuits 302 which is located in a rightmost position in the drawing outputs a reference signal. The others of the signal generation circuits 302 are configured the same as the signal generation circuit 302 located in the rightmost position of the drawing except that the others of the signal generation circuits 302 do not output a reference signal. Operation of the photoelectric conversion apparatus illustrated in FIG. 4 is the same as that of the first exemplary embodiment.

In the photoelectric conversion apparatus of this exemplary embodiment, the operation environments of the signal generation circuits 302 and the pixel output circuits 101 may be easily uniformed when compared with the photoelectric conversion apparatus of the first exemplary embodiment.

Fourth Exemplary Embodiment

A portion of a photoelectric conversion apparatus according to a fourth exemplary embodiment which is different from the third exemplary embodiment will be mainly described.

Figure 5A:
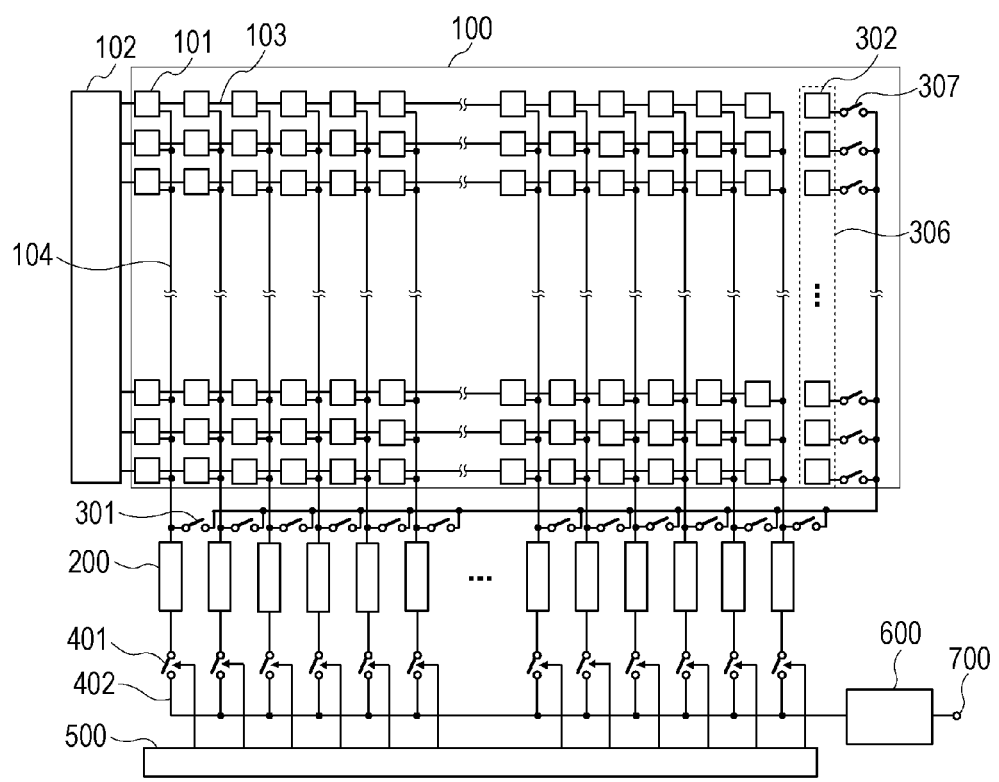
FIG. 5A is a diagram illustrating an example of a configuration of a photoelectric conversion apparatus according to a fourth exemplary embodiment.

The photoelectric conversion apparatus illustrated in FIG. 5A includes a signal generation circuit group 306 in a region corresponding to one column in a pixel array 100. Specifically, the photoelectric conversion apparatus illustrated in FIG. 5A includes signal generation circuits 302 corresponding to individual rows of pixel output circuits 101. The photoelectric conversion apparatus illustrated in FIG. 5A includes switches 307 in an electric path interposed between the signal generation circuits 302 of the individual rows and input nodes of signal processing circuits 200.

FIG. 5B is a timing chart illustrating operation of the photoelectric conversion apparatus illustrated in FIG. 5A. A timing generator brings one of the switches 307 corresponding to the signal generation circuit 302 of the first row to a conductive state at a time point t1. By this, the signal generation circuit 302 of the first row supplies a reference signal to the signal processing circuits 200 in a plurality of columns. After the signal processing circuits 200 of the individual columns generate amplification reference signals, the pixel output circuits 101 in the first row supply pixel signals to the input nodes of the signal processing circuits 200 of the individual columns. The signal processing circuits 200 in the individual columns generate amplification pixel signals. An output circuit 600 outputs signals representing differences between the amplification reference signals based on the reference signal output from the signal generation circuit 302 in the first row and the amplification pixel signals based on the pixel signals output from the pixel output circuits 101 in the first row.

Next, the timing generator brings the switch 307 in the second row to a conductive state. By this, the signal generation circuit 302 of the second row supplies a reference signal to the signal processing circuits 200 in the individual columns. Thereafter, the pixel output circuits 101 in the second row supply pixel signals to the input nodes of the signal processing circuits 200 in the individual columns. An operation circuit 604 included in the output circuit 600 outputs signals representing differences between the amplification reference signals based on the reference signal output from the signal generation circuit 302 in the second row and the amplification pixel signals based on the pixel signals output from the pixel output circuits 101 in the second row.

Hereafter, the operation circuit 604 similarly outputs signals representing differences between amplification reference signals based on a reference signal output from one of the signal generation circuits 302 and amplification pixel signals based on pixel signals output from the pixel output circuits 101 located in a row which is the same as that of the signal generation circuit 302.

Variation of the pixel signals of the pixel output circuits 101 may occur for individual rows. The signal variation occurs when potentials of the power supply line 1017 and the ground line 1018 vary for individual rows of the pixel output circuits 101.

In the photoelectric conversion apparatus of this exemplary embodiment, the operation circuit 604 may output signals obtained by subtracting components of the signal variation for individual rows of the pixel output circuits 101 from the amplification pixel signals.

Alternatively, the timing generator may simultaneously bring the switches 307 in the individual rows to a conductive state so that the signal generation circuits 302 in the individual rows simultaneously output respective reference signals. In this case, the photoelectric conversion apparatus performs the operation described with reference to FIG. 2B.

Fifth Exemplary Embodiment

A portion of a photoelectric conversion apparatus according to a fifth exemplary embodiment which is different from the first exemplary embodiment will be mainly described.

Figure 6:
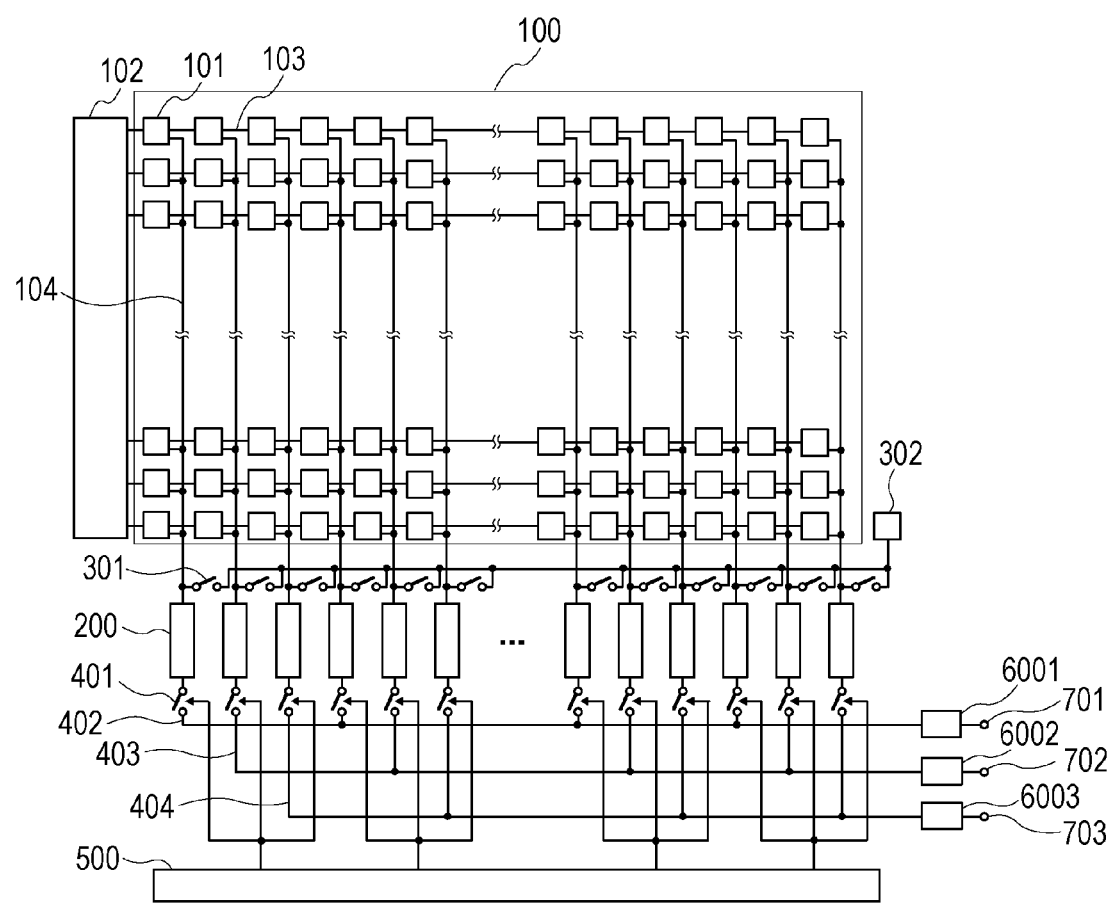
FIG. 6 is a diagram illustrating an example of a configuration of a photoelectric conversion apparatus according to a fifth exemplary embodiment.

FIG. 6 is a diagram illustrating the photoelectric conversion apparatus according to the fifth exemplary embodiment. The photoelectric conversion apparatus of the fifth exemplary embodiment is different from that of FIG. 1A in that signal processing circuits 200 in three columns output individually-generated signals in parallel.

In the photoelectric conversion apparatus illustrated in FIG. 6, a horizontal selection circuit 500 simultaneously brings switches 401 in three columns to a conductive state. By this, the signal processing circuits 200 in the three columns supply signals to output circuits 6001, 6002, and 6003 in parallel through transfer lines 402, 403, and 404. The output circuits 6001, 6002, and 6003 supply signals which have been subjected to arithmetic processing performed by operation circuits 604 included in the output circuits 6001, 6002, and 6003 to output nodes 701 to 703, respectively.

The output circuits 6001, 6002, and 6003 are configured the same as the output circuit 600 illustrated in FIG. 1A. Accordingly, each of the output circuits 6001, 6002, and 6003 includes a memory 603 which stores amplification reference signals. The photoelectric conversion apparatus illustrated in FIG. 1A is configured such that the memory 603 included in the output circuit 600 stores amplification reference signals for N columns. On the other hand, in the photoelectric conversion apparatus illustrated in FIG. 6, the memory 603 included in each of the output circuits 6001, 6002, and 6003 stores amplification reference signals for N/3 columns. By this, a degree of freedom of layout of the memory 603 which stores amplification reference signals may be improved when compared with the photoelectric conversion apparatus illustrated in FIG. 1A.

Furthermore, the photoelectric conversion apparatus illustrated in FIG. 6 may reduce a period of time in which signals generated by the signal processing circuits 200 of all the columns are output from the signal processing circuits 200 to ⅓ of the photoelectric conversion apparatus illustrated in FIG. 1A.

In the photoelectric conversion apparatus illustrated in FIG. 6, the operation circuits 604 included in the output circuits 6001, 6002, and 6003 generate signals representing differences between amplification pixel signals and the amplification reference signals. By this, signals may be generated by subtracting differences among offset components of electric paths from the signal processing circuits 200 to the output circuits 6001, 6002, and 6003 and differences of offset components of buffer circuits 605 included in the output circuits 6001, 6002, and 6003 from the amplification pixel signals.

Sixth Exemplary Embodiment

A portion of a photoelectric conversion apparatus according to a sixth exemplary embodiment which is different from the fifth exemplary embodiment will be mainly described.

Figure 7A:
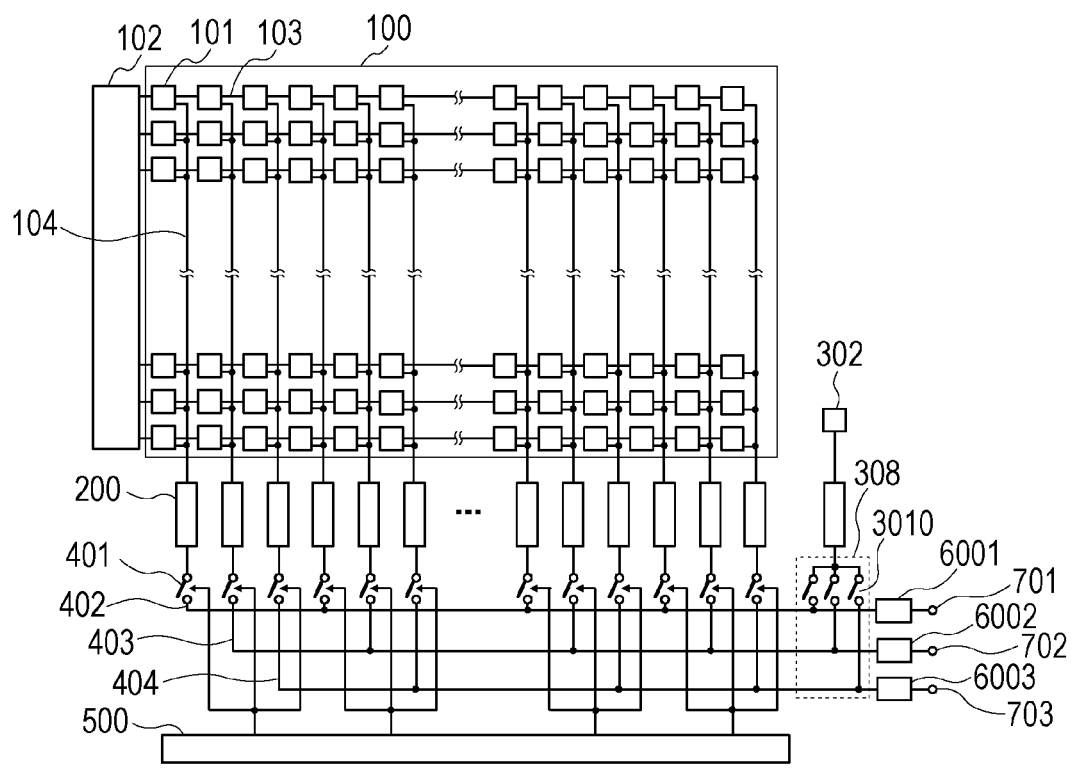
FIG. 7A is a diagram illustrating an example of a configuration of a photoelectric conversion apparatus according to a sixth exemplary embodiment.

FIG. 7A is a diagram illustrating the photoelectric conversion apparatus according to the sixth exemplary embodiment. The photoelectric conversion apparatus of the sixth exemplary embodiment is different from that illustrated in FIG. 6 in that an amplification reference signal based on a reference signal is supplied to a node obtained by short-circuiting input nodes of output circuits 6001, 6002, and 6003 arranged in parallel using a switch group 308 including switches 3010.

In this exemplary embodiment, offset components of the output circuits 6001, 6002, and 6003 are focused as offset components of a plurality of signal reading paths.

Figure 7B:
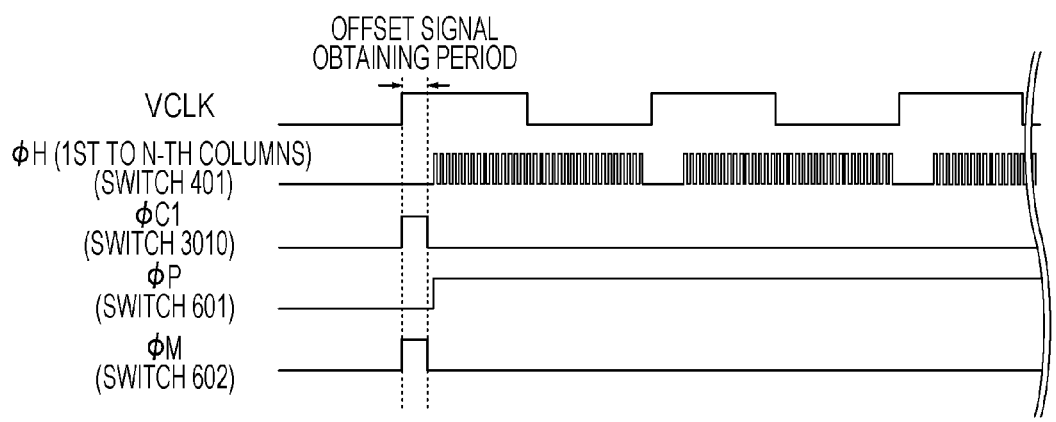
FIG. 7B is a diagram illustrating an example of operation of the photoelectric conversion apparatus according to the sixth exemplary embodiment.

FIG. 7B is a timing chart illustrating operation of the photoelectric conversion apparatus illustrated in FIG. 7A.

A timing generator brings a control signal φC1 which is used to control the switches 3010 to an H level. Furthermore, the timing generator brings a control signal φM to an H level. By this, an amplification reference signal is input to the node obtained by short-circuiting the input nodes of the output circuits 6001, 6002, and 6003. Buffer circuits 605 of the output circuits 6001, 6002, and 6003 supply signals based on the amplification reference signal to corresponding memories 603. The timing generator brings the control signals φC1 and φM to an L level. A period of time in which the timing generator maintains the control signal φM in the H level corresponds to an offset signal obtaining period in which the memories 603 of the output circuits 6001, 6002, and 6003 store signals having offset components (hereinafter referred to as "offset signals").

The memories 603 included in the output circuits 6001, 6002, and 6003 store signals having the offset components of the output circuits 6001, 6002, and 6003 disposed in parallel. The output circuits 6001, 6002, and 6003 generate signals representing differences between amplification pixel signals and the offset signals. By this, the photoelectric conversion apparatus illustrated in FIG. 7A may output signals in which influence from differences among the offset components of the output circuits 6001, 6002, and 6003 is reduced in the amplification pixel signals.

Furthermore, the photoelectric conversion apparatus illustrated in FIG. 1A is configured such that the memory 603 stores the amplification reference signals for all the columns. On the other hand, the photoelectric conversion apparatus illustrated in FIG. 7A is configured such that the memories 603 of the output circuits 6001, 6002, and 6003 store the signals based on the single amplification reference signal. Accordingly, in the photoelectric conversion apparatus illustrated in FIG. 7A, circuit sizes of the memories 603 of the output circuits 6001, 6002, and 6003 may be reduced when compared with the memory 603 of the photoelectric conversion apparatus illustrated in FIG. 1A.

Figure 7C:
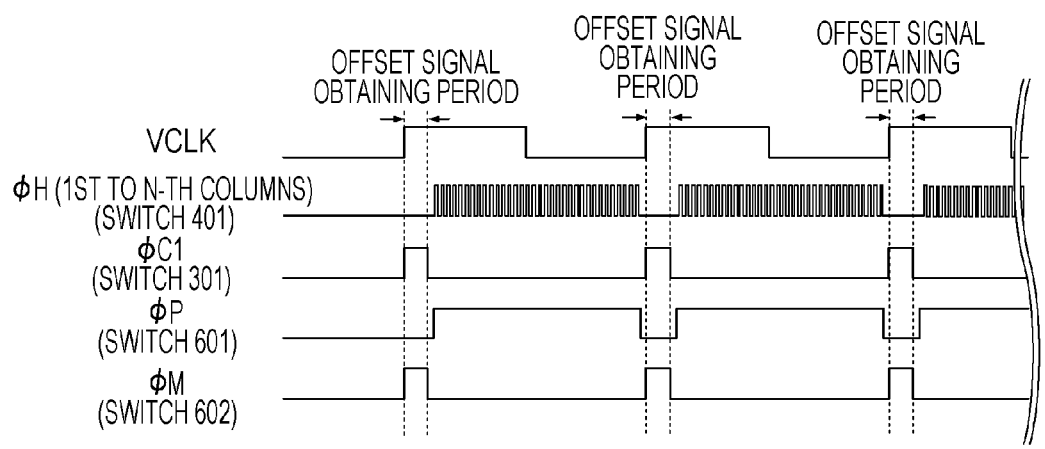
FIG. 7C is a diagram illustrating another example of operation of the photoelectric conversion apparatus according to the sixth exemplary embodiment.

Furthermore, the photoelectric conversion apparatus illustrated in FIG. 7A may operate such that offset signals are obtained for individual rows of the pixel output circuits 101 as illustrated in a timing chart of FIG. 7C. When the photoelectric conversion apparatus operates as illustrated in FIG. 7C, even when an operation environment is changed while the rows of the pixel output circuits 101 are scanned, the output circuits 6001, 6002, and 6003 may generate signals in which influence of the operation environment is subtracted from the amplification pixel signals.

Seventh Exemplary Embodiment

A portion of a photoelectric conversion apparatus according to a seventh exemplary embodiment which is different from the sixth exemplary embodiment will be mainly described.

Figure 8:
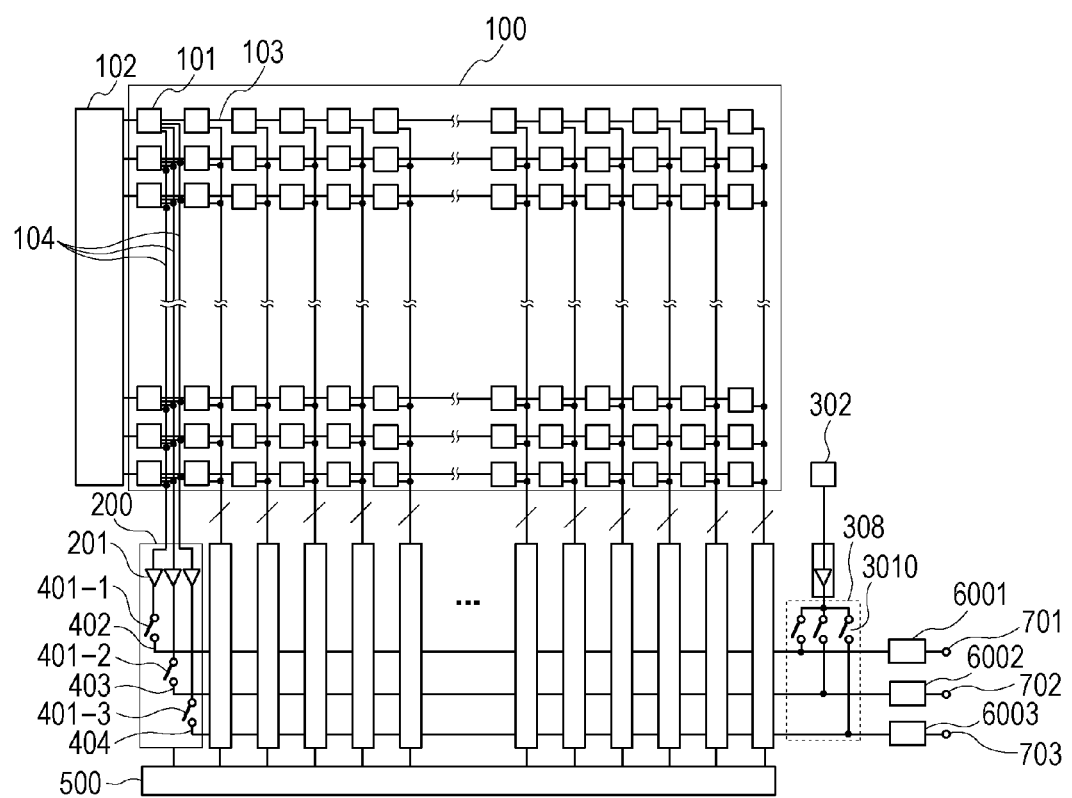
FIG. 8 is a diagram illustrating an example of a configuration of a photoelectric conversion apparatus according to a seventh exemplary embodiment.

FIG. 8 is a diagram illustrating the photoelectric conversion apparatus according to the seventh exemplary embodiment. In the photoelectric conversion apparatus illustrated in FIG. 8, each of pixel output lines 104 in individual rows have three signal lines. The three signal lines transmit signals of a reset level, first amplification signals which are obtained by amplifying pixel signals by a first amplification factor, and second amplification signals which are obtained by amplifying the pixel signals by a second amplification factor which are output from a corresponding number of pixel output circuits 101 to a corresponding one of signal processing circuits 200. Each of all the pixel output lines 104 in the individual columns has three signal lines.

Amplification circuits 201 included in each of the signal processing circuits 200 generate signals by amplifying the signals of the reset level, the first amplification signals, and the second amplification signals which are supplied from the pixel output circuits 101. A horizontal selection circuit 500 simultaneously brings switches 401-1, 401-2, and 401-3 included in a corresponding one of the signal processing circuits 200 to a conductive state. By this, the transfer line 402 transmits the signals obtained by amplifying the signals of the reset level to an output circuit 6001. The transfer line 403 transmits the signals obtained by amplifying the first amplification signals to an output circuit 6002. The transfer line 404 transmits the signals obtained by amplifying the second amplification signals to an output circuit 6003.

In the photoelectric conversion apparatus of FIG. 8, an amplification reference signal is input to a node obtained by short-circuiting the input nodes of the output circuits 6001, 6002, and 6003. By this, as with the photoelectric conversion apparatus illustrated in FIG. 7A, offset signals of the output circuits 6001, 6002, and 6003 may be obtained.

The output circuit 6001 outputs signals representing differences between the signals obtained by amplifying the signals of the reset level and the offset signal stored in the output circuit 6001, the output circuit 6002 outputs signals representing differences between the signals obtained by amplifying the first amplification signals and the offset signal stored in the output circuit 6002, and the output circuit 6003 outputs signals representing differences between the signals obtained by amplifying the second amplification signals and the offset signal stored in the output circuit 6003. By this, the photoelectric conversion apparatus illustrated in FIG. 8 may output signals in which influence from differences among the offset components of the output circuits 6001, 6002, and 6003 is reduced.

Eighth Exemplary Embodiment

Figure 9A:
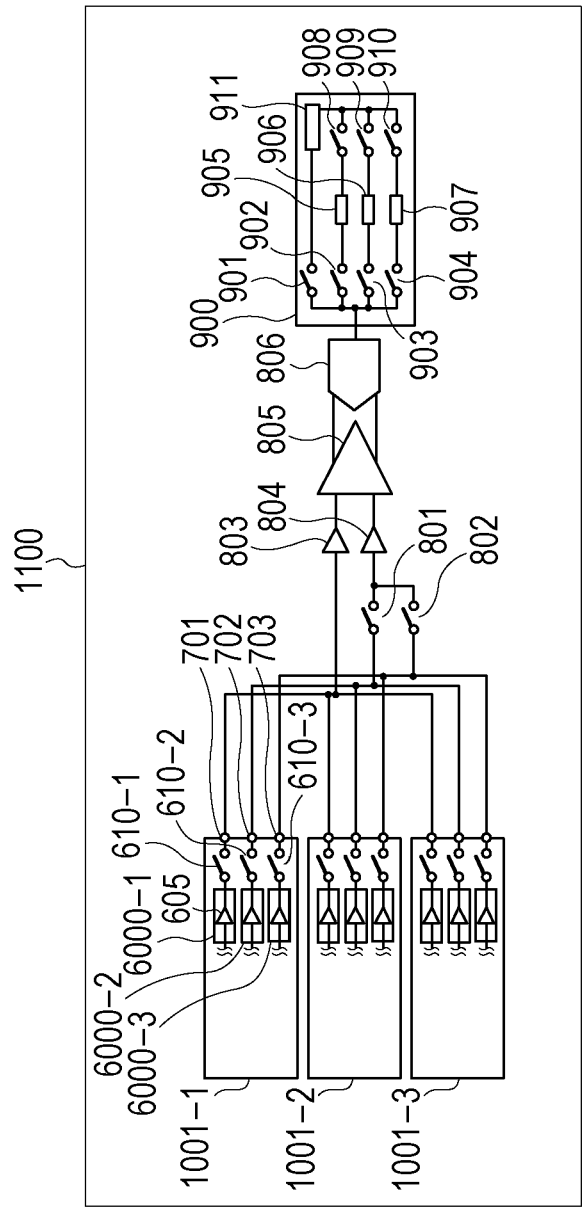
FIG. 9A is a diagram illustrating an example of a configuration of a photoelectric conversion system according to an eighth exemplary embodiment.

FIG. 9A is a diagram illustrating a photoelectric conversion system according to an eighth exemplary embodiment.

A photoelectric conversion system 1100 illustrated in FIG. 9A includes a plurality of photoelectric conversion apparatuses 1001-1, 1001-2, and 1001-3. The photoelectric conversion apparatuses 1001-1, 1001-2, and 1001-3 are disposed on different semiconductor substrates. The photoelectric conversion apparatuses 1001-1, 1001-2, and 1001-3 are configured the same as the photoelectric conversion apparatus illustrated in FIG. 8 except for configurations of output circuits 6000-1, 6000-2, and 6000-3. Each of the output circuits 6000-1, 6000-2, and 6000-3 includes a buffer circuit 605 but does not include the switches 601 and 602, the memory 603, and the operation circuit 604 which are included in each of the output circuits 6001, 6002, and 6003 illustrated in FIG. 8. In FIG. 9A, among components of the photoelectric conversion apparatuses, the output circuits 6000-1, 6000-2, and 6000-3, the buffer circuits 605, switches 610-1, 610-2, and 610-3, and output nodes 701, 702, and 703 are illustrated and descriptions of portions overlap with the photoelectric conversion apparatus illustrated in FIG. 8 are omitted.

In the photoelectric conversion system 1100 illustrated in FIG. 9A, buffer circuits 803 and 804, a differential amplifier 805, an A/D converter 806, and a data processing circuit 900 are shared by the photoelectric conversion apparatuses 1001-1, 1001-2, and 1001-3. The data processing circuit 900 includes switches 901, 902, 903, 904, 908, 909, and 910, memories 905, 906, and 907, and a data composition circuit 911.

A controller, not illustrated, included in the photoelectric conversion system 1100 brings the switches 610-1, 610-2, and 610-3 of the photoelectric conversion apparatus 1001-1 among the photoelectric conversion apparatuses 1001-1, 1001-2, and 1001-3 to a conductive state. By this, the output circuit 6000-1 of the photoelectric conversion apparatus 1001-1 supplies signals obtained by amplifying signals of a reset level (hereinafter referred to as "N signals") to the buffer circuit 803. Furthermore, the output circuit 6000-2 of the photoelectric conversion apparatus 1001-1 supplies signals obtained by amplifying first amplification signals (hereinafter referred to as "S1 signals") to a switch 801. Moreover, the output circuit 6000-3 of the photoelectric conversion apparatus 1001-1 supplies signals obtained by amplifying second amplification signals (hereinafter referred to as "S2 signals") to a switch 802. When the controller brings the switch 801 to a conductive state, the S1 signals are supplied to the buffer circuit 804. Furthermore, when the controller brings the switch 802 to a conductive state, the S2 signals are supplied to the buffer circuit 804. The differential amplifier 805 supplies signals obtained by amplifying differences between the signals supplied from the buffer circuits 803 and 804 to the A/D converter 806.

The A/D converter 806 outputs a result of A/D conversion to the data processing circuit 900 which generates image data.

FIG. 9B is a timing chart illustrating operation of the photoelectric conversion system 1100 illustrated in FIG. 9A.

Operation performed in a case where the switches 610-1, 610-2, and 610-3 of the photoelectric conversion apparatus 1001-1 are in a conductive state will be described. In a period of time in which a timing generator of the photoelectric conversion apparatus 1001-1 maintains switches 3010 in a conductive state, the controller brings the switches 610-1, 610-2, and 610-3 to a conductive state. By this, the output circuits 6000-1, 6000-2, and 6000-3 of the photoelectric conversion apparatus 1001-1 supply respective amplification reference signals to the output nodes 701, 702, and 703, respectively. Furthermore, in a period of time in which the switches 3010 of the photoelectric conversion apparatus 1001-1 are in a conducive state, the controller brings the switch 902 to a conductive state. Moreover, in a period of time in which the switch 902 is in the conductive state, the controller brings the switch 801 to a conductive state. By this, the differential amplifier 805 supplies a signal based on a difference between the amplification reference signals output from the output circuits 6000-1 and 6000-2 to the A/D converter 806. The A/D converter 806 converts the signal based on the difference between the amplification reference signals output from the output circuits 6000-1 and 6000-2 into a digital signal. The digital signal is referred to as a "digital signal A". The memory 905 stores the digital signal A supplied from the A/D converter 806.

Next, after the controller brings the switch 801 to a nonconductive state, the switch 802 is brought to a conductive state. By this, the differential amplifier 805 supplies a signal based on a difference between the amplification reference signals output from the output circuits 6000-1 and 6000-3 to the A/D converter 806. The A/D converter 806 converts the signal based on the difference between the amplification reference signals output from the output circuits 6000-1 and 6000-3 into a digital signal. The digital signal is referred to as a "digital signal B". The memory 905 which stores the digital signal A further stores the digital signal B supplied from the A/D converter 806.

The controller brings the switches 802 and 902 to a nonconductive state. Furthermore, the timing generator of the photoelectric conversion apparatus 1001-1 brings the switches 3010 to a nonconductive state. Then the controller brings the switch 901 to a conductive state. The horizontal selection circuit 500 of the photoelectric conversion apparatus 1001-1 successively brings control signals ϕH to an H level. By this, the output circuits 6000-1, 6000-2, and 6000-3 supply N signals, S1 signals, and S2 signals to the output nodes 701, 702, and 703, respectively.

The controller brings the switch 801 to a conductive state. By this, the differential amplifier 805 supplies signals based on differences between the N signals and the S1 signals to the A/D converter 806. The A/D converter 806 converts the signals based on the differences between the N signals and the S1 signals into digital signals. The digital signals are referred to as "digital signals C". The A/D converter 806 supplies the digital signals C to the data composition circuit 911. Furthermore, the controller brings the switch 908 to a conductive state. By this, the memory 905 supplies the digital signal A to the data composition circuit 911. The data composition circuit 911 generates signals representing differences between the digital signals C and the digital signal A and generates first image data using the difference signals.

Next, after bringing the switch 801 to a nonconductive state, the controller brings the switch 802 to a conductive state. By this, the differential amplifier 805 supplies signals based on differences between the N signals and the S2 signals to the A/D converter 806. The A/D converter 806 converts the signals based on the differences between the N signals and the S2 signals to digital signals. The digital signals are referred to as "digital signals D". The A/D converter 806 supplies the digital signals D to the data composition circuit 911. Furthermore, the controller brings the switch 908 to a conductive state. By this, the memory 905 supplies the digital signal B to the data composition circuit 911. The data composition circuit 911 generates signals representing differences between the digital signals D and the digital signal B and generates second image data using the difference signals.

In this way, the data composition circuit 911 generates the first image data and the second image data using the signals output from the photoelectric conversion apparatus 1001-1.

The digital signal A is generated on the basis of a difference between an offset component of an electric path from the transfer line 402 to the A/D converter 806 and an offset component of an electric path from a transfer line 403 to the A/D converter 806. The signal based on the difference between the offset components is also included in the digital signals C. The data composition circuit 911 subtracts the digital signal A from the digital signals C. By this, the data composition circuit 911 may generate the first image data which is less affected by the difference between the offset component of the electric path from the transfer line 402 to the A/D converter 806 and the offset component of the electric path from the transfer line 403 to the A/D converter 806.

The digital signal B is generated on the basis of a difference between the offset component of the electric path from the transfer line 402 to the A/D converter 806 and an offset component of an electric path from a transmission line 404 to the A/D converter 806. The signal based on the difference between the offset components is also included in the digital signals D. The data composition circuit 911 subtracts the digital signal B from the digital signals D. By this, the data composition circuit 911 may generate the second image data which is less affected by the difference between the offset component of the electric path from the transfer line 402 to the A/D converter 806 and the offset component of the electric path from the transfer line 404 to the A/D converter 806.

The signals output from the photoelectric conversion apparatus 1001-1 have been described hereinabove. Operation of the photoelectric conversion apparatus 1001-2 is the same as that of the photoelectric conversion apparatus 1001-1 except that a digital signal A and a digital signal B are stored in the memory 906 instead of the memory 905. Operation of the photoelectric conversion apparatus 1001-3 is the same as that of the photoelectric conversion apparatus 1001-1 except that a digital signal A and a digital signal B are stored in the memory 907 instead of the memory 905.

The photoelectric conversion system 1100 of this exemplary embodiment includes components disposed in parallel such as the plurality of photoelectric conversion apparatuses 1001-1, 1001-2, and 1001-3, the plurality of output circuits 6000-1, 6000-2, and 6000-3, the buffer circuits 803 and 804, the transfer lines which transmit signals, and the like. Offsets are generated among the signals output from the photoelectric conversion apparatuses 1001-1, 1001-2, and 1001-3 due to variation of characteristics of the components disposed in parallel, variation of fabrication among the photoelectric conversion apparatuses 1001-1, 1001-2, and 1001-3, temperature differences among the photoelectric conversion apparatuses 1001-1, 1001-2, and 1001-3, potential differences among power supply voltages, and the like. The offsets cause generation of difference in level of brightness of an image generated using image data of the photoelectric conversion apparatuses 1001-1, 1001-2, and 1001-3 resulting in deterioration of image quality.

The photoelectric conversion system 1100 of this exemplary embodiment generates the signals representing the differences between the digital signals C and the digital signal A and the signals representing the differences between the digital signals D and the digital signal B. By this, the offsets generated among the signals output from the photoelectric conversion apparatuses 1001-1, 1001-2, and 1001-3 due to variation of characteristics of the components disposed in parallel, variation of fabrication among the photoelectric conversion apparatuses 1001-1, 1001-2, and 1001-3, temperature differences among the photoelectric conversion apparatuses 1001-1, 1001-2, and 1001-3, potential differences among power supply voltages, and the like may be reduced. Accordingly, the generation of difference in level of brightness of an image generated using image data of the photoelectric conversion apparatuses 1001-1, 1001-2, and 1001-3 is suppressed.

Note that the photoelectric conversion system 1100 of this exemplary embodiment may generate the digital signal A and the digital signal B for individual rows of pixel output circuits 101 similarly to the operation illustrated in FIG. 7C.

Ninth Exemplary Embodiment

FIG. 10 is a diagram illustrating a photoelectric conversion system according to a ninth exemplary embodiment. The photoelectric conversion system of this exemplary embodiment includes a plurality of the photoelectric conversion systems 1100 illustrated in FIG. 9A as unit photoelectric conversion systems. In this exemplary embodiment, each of the unit photoelectric conversion systems 1100 performs the operation illustrated in the timing chart of FIG. 9B. Furthermore, the unit photoelectric conversion systems 1100 perform the operation illustrated in FIG. 9B in parallel to one another. Each of the unit photoelectric conversion systems 1100 outputs a signal to a video image output apparatus 1200. The video image output apparatus 1200 generates an image in accordance with image data output from the individual unit photoelectric conversion systems 1100.

Also in the photoelectric conversion systems of this exemplary embodiment, an effect similar to the eighth exemplary embodiment may be obtained.

According to the present invention, offset components of a plurality of signal reading paths caused by change of an operation environment of a photoelectric conversion apparatus may be appropriately corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-141204, filed Jul. 5, 2013, which is hereby incorporated by reference herein in its entirety.

What is claimed is:

1. A photoelectric conversion apparatus comprising:
a plurality of pixel output circuits each including a photoelectric conversion unit which generates electric charge and a first amplification unit which outputs pixel signals;
a signal processing circuit configured to process the pixel signals;
a signal generation circuit;
a plurality of output circuits;
a first transfer line; and
a second transfer line,
wherein the pixel signals having different signal values are supplied from the first amplification unit to the signal processing circuit,
the signal processing circuit is electrically connected to an input node of a first output circuit through the first transfer line, the first output circuit being one of the plurality of output circuits,
the signal processing circuit is electrically connected to an input node of a second output circuit through the second transfer line, the second circuit being one of the plurality of output circuits,
the signal generation circuit has a second amplification unit to generate a reference signal, and
a signal based on the reference signal is supplied commonly to the input node of the first output circuit and the input node of the second output circuit,
wherein the first and the second amplifier circuits each includes a source follower circuit having a transistor.

2. The photoelectric conversion apparatus according to claim 1, wherein
the first amplification unit outputs the pixel signal.

3. The photoelectric conversion apparatus according to claim 2, wherein
a common voltage is input to the pixel output circuits and the signal generation circuit,
the transistor of the source follower circuit of the first amplification unit is a first transistor,
the transistor of the source follower circuit of the second amplification unit is a second transistor,
each of the plurality of pixel output circuits further includes a third transistor,
the first transistor has a first input node to which the electric charge is supplied, a first main node to which the voltage is supplied, and a second main node which outputs the pixel signal in accordance with a potential of the first input node,
the third transistor supplies a reset potential to the first input node, and
the second transistor has a second input node to which a signal corresponding to the reset potential is supplied, a third main node to which the voltage is supplied, and a fourth main node which outputs the reference signal in accordance with the signal corresponding to the reset potential.

4. The photoelectric conversion apparatus according to claim 3, wherein
channel widths of the first transistors and the second transistor are substantially the same as each other, and channel lengths of the first transistors and the second transistor are substantially the same as each other.

5. The photoelectric conversion apparatus according to claim 3, wherein a signal value of the signal supplied to the second input node is changed so that a signal value of the reference signal output from the signal generation circuit is changed.

6. The photoelectric conversion apparatus according to claim 4, wherein
a signal value of the signal supplied to the second input node is changed so that a signal value of the reference signal output from the signal generation circuit is changed.

7. The photoelectric conversion apparatus according to claim 1, wherein
the signal based on the reference signal is supplied to a node obtained by short-circuiting the input node of the first output circuit and the input node of the second output circuit.

8. The photoelectric conversion apparatus according to claim 1, wherein
each of the first and second output circuits has a memory which stores the signal based on the reference signal, and
each of the first and second output circuits includes an operation circuit which generates signals representing differences between the signal stored in the memory and the signals based on the pixel signals.

9. The photoelectric conversion apparatus according to claim 5, wherein
the plurality of pixel output circuits is disposed in a plurality of columns, and
the plurality of signal processing circuits is disposed so as to correspond to the columns of the plurality of pixel output circuits.

10. A photoelectric conversion system comprising:
a plurality of the photoelectric conversion apparatuses set forth in claim 1 which are disposed on different semiconductor substrates; and
a data processing circuit configured to receive signals output from the photoelectric conversion apparatuses.

11. A photoelectric conversion system comprising:
a photoelectric conversion apparatus; and
a data processing circuit to which a signal output from the photoelectric conversion apparatus is supplied,
wherein the photoelectric conversion apparatus comprises:
a plurality of pixel output circuits each including a photoelectric conversion unit which generates electric charge and a first amplification unit which outputs pixel signals;
a signal processing circuit configured to process the pixel signals;
a signal generation circuit;
a plurality of output circuits;
a first transfer line; and
a second transfer line,
wherein the pixel signals having different signal values are supplied from the first amplification unit to the signal processing circuit,
the signal processing circuit is electrically connected to an input node of a first output circuit through the first transfer line, the first output circuit being one of the plurality of output circuits,
the signal processing circuit is electrically connected to an input node of a second output circuit through the second transfer line, the second circuit being one of the plurality of output circuits,
the signal generation circuit has a second amplification unit to generate a reference signal, and a signal based on the reference signal is supplied commonly to the input node of the first output circuit and the input node of the second output circuit, wherein the first and the second amplifier circuits each includes a source follower circuit having a transistor, wherein the data processing circuit includes a memory which stores a signal which the first output circuit processed based on the reference signal and a signal which the second output circuit processed based on the reference signal, and the data processing circuit includes an operation circuit which generates a signal representing a difference between the signal stored in the memory and a signal obtained by processing the pixel signal.

12. The photoelectric conversion system according to claim 11, comprising:

a plurality of photoelectric conversion apparatuses which are disposed on different semiconductor substrates, wherein the data processing circuit includes a plurality of memories, and each of the plurality of memories stores signals which the first and second output circuits of a corresponding one of the photoelectric conversion apparatuses individually processed based on the reference signal.

* * * * *